(12) United States Patent
Barfurth et al.

(10) Patent No.: US 6,444,315 B1
(45) Date of Patent: Sep. 3, 2002

(54) SURFACE-MODIFIED FLAME RETARDANTS CONTAINING AN ORGANIC SILICON COMPOSITION, THEIR USE, AND PROCESS FOR THEIR PREPARATION

(75) Inventors: Dieter Barfurth, Rheinfelden (DE); Helmut Mack, Rheinfelden (DE); Karl Goetzmann, Budenheim (DE); Vincente Mans, Badalona (ES); Hans-Dieter Naegerl, Dudenhofen (DE); Klaus Sommer, Bad Duerkheim (DE)

(73) Assignees: Degussa AG, Duesseldorf (DE); Chemische Fabrik Budenheim Rudolf A. Oetker, Budenheim (DE)

( * ) Notice: Subject to any disclaimer, the term of this patent is extended or adjusted under 35 U.S.C. 154(b) by 0 days.

(21) Appl. No.: 09/347,534

(22) Filed: Jul. 6, 1999

(30) Foreign Application Priority Data

Jul. 6, 1998 (DE) .......................... 198 30 128

(51) Int. Cl.⁷ .................................. B32B 5/16
(52) U.S. Cl. ..................... 428/403; 429/407; 429/920
(58) Field of Search ................. 428/403, 407, 428/920

(56) References Cited

U.S. PATENT DOCUMENTS 5,412,014 A * 5/1995 Romenesko ................ 524/416
5,532,302 A * 7/1996 Nakanishi et al. .......... 524/143
5,705,823 A * 1/1998 Fishback ............... 252/182.27
5,770,644 A * 6/1998 Yamamoto et al. ......... 524/120

FOREIGN PATENT DOCUMENTS

| DE | 33 16 880 | 11/1984 |
|---|---|---|
| DE | 196 24 032 | 12/1997 |
| DE | 196 39 782 | 4/1998 |
| EP | 0 180 790 | 5/1986 |
| EP | 0 518 057 | 12/1992 |
| EP | 0 584 567 | 3/1994 |
| EP | 0 675 128 | 10/1995 |
| EP | 0 716 127 | 6/1996 |
| EP | 0 716 128 | 6/1996 |
| WO | WO 98/08898 | 3/1998 |

OTHER PUBLICATIONS

Derwent Abstracts, AN 1991–210606, JP 3–131508, Jun. 5, 1991.

* cited by examiner

Primary Examiner—Hoa T. Le
(74) Attorney, Agent, or Firm—Oblon, Spivak, McClelland, Maier & Neustadt, P.C.

(57) ABSTRACT

An encapsulated flame retardant is made by a process including applying an organic silicon composition to a powder flame retardant. The organic silicon composition is an organofunctional-silane or a mixture of organofunctional silanes, an oligomeric organosiloxane or a mixture of oligomeric organosiloxanes, or a solvent-containing preparation based on monomeric organosilanes and/or on oligomeric organosiloxanes, or a preparation based on water-soluble organopolysiloxanes, or mixtures of any or all of these. These surface-modified flame retardants are used in particular in polymers and polymer compounds, for rendering naturally occurring materials flame retardant, and also for the intumescent coating of combustible materials.

40 Claims, No Drawings

SURFACE-MODIFIED FLAME RETARDANTS CONTAINING AN ORGANIC SILICON COMPOSITION, THEIR USE, AND PROCESS FOR THEIR PREPARATION

BACKGROUND OF THE INVENTION

1. Field of the Invention

The present invention relates to a process for modifying the surface of flame retardants by encapsulating the particles with a silicon-containing coating agent, and to the corresponding flame retardants themselves and their use.

2. Discussion of the Background

It is known that ammonium phosphates, ammonium polyphosphates, melamine phosphates, melamine borates and melamine cyanurates can be used as halogen-free flame retardants, e.g. for plastics. EP 0 584 567 A1 discloses a flame-retardant plastic molding composition made from olefin polymers and from a flame-retardant system made from ammonium polyphosphate and from a polycondensate made from tris(2-hydroxyethyl) isocyanurate and from an aromatic polycarboxylic acid. DE-A 33 16 880 describes a process for preparing hydrolysis-stable, water-insoluble ammonium polyphosphates by coating with, respectively, melamine-formaldehyde resins and phenol-formaldehyde resins. EP 0 180 790 A1 moreover describes a coated, powder ammonium polyphosphate in which polyurea, i.e. a reaction product made from isocyanate and water, is used for the encapsulation procedure.

Although ammonium polyphosphates, for example, give such plastics good flame retardancy, a disadvantage is that they migrate out of the plastic during the course of its service life and are washed out by environmental agents, such as moisture, since in particular untreated ammonium polyphosphates, but also other phosphoric acid derivatives, have considerable solubility in water.

Cured silicone resins have also been described as a coating material. JP-A 3-131 508, for example, teaches the encapsulation of ammonium polyphosphate as a slurry in an organic solvent with a curable silicone resin, where small amounts of an aminotriethoxysilane are used as a curing agent. However, a joint feature of all of these processes is that the preparation of such surface-treated flame retardants is very complicated, and this noticeably increases the cost of the product. In addition, environmental problems are caused by the use of environmentally unfriendly solvents and by the resultant wastewater and residues.

SUMMARY OF THE INVENTION

An object of the present invention is to provide a simple and environmentally friendly process for modifying the properties of flame retardants, such as ammonium polyphosphates.

According to the invention this object has been achieved as described in the claims.

Surprisingly, it has been found that surface-modified flame retardants can be obtained in a simple, cost-effective and at the same environmentally friendly manner by applying an organofunctional-silane or a mixture of organofunctional silanes or an oligomeric organosiloxane or a mixture of oligomeric organosiloxanes or a solvent-containing preparation based on monomeric organosilanes and/or on oligomeric organosiloxanes or a preparation based on water-soluble organopolysiloxanes to a powder flame retardant. The present invention also provides surface-modified flame retardants which are prepared by this process.

DETAILED DESCRIPTION OF THE INVENTION

As used hereinafter, the phrase "organic silicon composition" means an organofunctional-silane or a mixture of organofunctional silanes, an oligomeric organosiloxane or a mixture of oligomeric organosiloxanes, or a solvent-containing preparation based on monomeric organosilanes and/or on oligomeric organosiloxanes, or a preparation based on water-soluble organopolysiloxanes, or mixtures of any or all of these.

The phrase "solvent-containing preparation based on" means that the preparation referred to is prepared by mixing at least the compounds it is based on with a solvent.

A suitable method of applying here is direct dropwise addition, injection or spraying of the coating agent into a fluidized bed of the flame retardant to be treated, whereupon the coating agent generally reacts with the surface of the flame retardant and thus encapsulates the particles. Water of condensation, and also in some cases small amounts of alcohol, can be produced here by condensation or hydrolysis, and these are introduced with the exhausted process air in a manner known per se into an exhaust air purification procedure, e.g. a condensation or catalytic or thermal post-incineration procedure.

A cost-effective and environmentally friendly, and therefore particularly advantageous, method is to use an aqueous preparation based on water-soluble organopolysiloxanes, since virtually exclusively water escapes into the exhausted process air. An additional factor is that explosion protection of the plant is unnecessary. The method of operation described, furthermore, does not produce any filtration residues or wash water.

The present invention provides a process for modifying the surface of flame retardants by encapsulating the particles with a silicon containing coating agent, by applying an organofunctional silane or a mixture of organo functional silanes or an oligomeric organosiloxane or a mixture of oligomeric organosiloxanes or a solvent-containing preparation based on monomeric organosilanes and/or on oligomeric organosiloxanes or a preparation based on water-soluble organopolysiloxanes to a powder flame retardant. The flame retardant is kept in motion during the coating procedure.

The novel process preferably uses from 0.05 to 10% by weight, particularly preferably from 0.1 to 3% by weight, very particularly preferably from 0.5 to 1.5% by weight, of silicon-containing coating agent, based on the amount of flame retardant. The coating agent may be applied over a period of from 10 seconds to 2 hours at a temperature of from 0 to 200° C., preferably over a period of from 30 seconds to 10 minutes at a temperature of from 20 to 100° C., particularly preferably over a period of from 1 to 3 minutes at a temperature of from 30 to 80° C.

The flame retardant encapsulated with coating agent may be post-treated by exposure to heat or to reduced pressure, or to reduced pressure together with heat. This post-treatment of the flame retardant encapsulated with coating agent preferably takes place at a temperature of from 0 to 200° C., particularly preferably at a temperature of from 80 to 150° C., very particularly preferably at a temperature of from 90 to 120° C.

The process may be carried out in a stream of air or of inert gas, such as nitrogen or carbon dioxide. The process may also be carried out by repeating the coating procedure, and if desired a subsequent drying of the encapsulated flame retardant, one or more times.

The flame retardants used in the novel process preferably have an average particle size ($d_{50}$) of from 1 to 100 μm, particularly preferably from 2 to 25 μm, very particularly preferably from 5 to 15 μm. A suitable method is to use a powder flame retardant of this type in dry, i.e. free-flowing, form.

Flame retardants preferably used in the novel process are: ammonium orthophosphates, e.g. $NH_4H_2PO_4$, $(NH_4)_2HPO_4$ or mixtures of these (e.g. FR CROSS® 282, FABUTIT® 747 S), ammonium diphosphates, e.g. $NH_4H_3P_2O_7$, $(NH_4)_2H_2P_2O_7$, $(NH_4)_3HP_2O_7$, $(NH_4)_4P_2O_7$ or mixtures of these (e.g. FR CROS® 134), ammonium polyphosphates, in particular but not exclusively those found in J. Am. Chem. Soc. 91, 62 (1969), e.g. those with crystal structure phase 1 (e.g. FR CROS® 480), or with crystal structure phase 2 (e.g. FR CROS® 484) or mixtures of these (e.g. FR CROS® 485), melamine orthophosphates, e.g. $C_3H_6N_6 \cdot H_3PO_4$, $2C_3H_6N_6 \cdot H_3PO_4$, $3C_3H_6N_6 \cdot 2H_3PO_4$, $C_3H_6N_6 \cdot H_3PO_4$, melamine diphosphates, e.g. $C_3H_6N_6 \cdot H_4P_2O_7$, $2C_3H_6N_6 \cdot H_4P_2O_7$, $3C_3H_6N_6 \cdot H_4P_2O_7$ or $4C_3H_6N_6 \cdot H_4P_2O_7$, melamine polyphosphates, melamine borates, e.g. BUDIT® 313, melamine cyanurate, e.g. BUDIT® 315, melamine borophosphates, melamine 1,2-phthalates, melamine 1,3-phthalates, melamine 1,4-phthalates and melamine oxalates.

The organofunctional silanes used in the novel process are preferably alkoxysilanes with aminoalkyl or epoxyalkyl or acryloxyalkyl or methacryloxyalkyl or mercaptoalkyl or alkenyl or alkyl functionality, and in a suitable method the abovementioned hydrocarbon moieties contain from 1 to 8 carbon atoms and the alkyl groups may be linear, branched or cyclic. Particularly preferred organofunctional alkoxysilanes are: 3-aminopropyltrialkoxysilanes, 3-aminopropylmethyldialkoxysilanes, 3-glycidyloxypropyltrialkoxysilanes, 3-acryloxypropyltrialkoxysilanes, 3-methacryloxypropyltrialkoxysilanes, 3-mercaptopropyltrialkoxysilanes, 3-mercaptopropylmethyldialkoxysilanes, vinyltrialkoxysilanes, vinyltris(2-methoxyethoxy)silane, propyltrialkoxysilanes, butyltrialkoxysilanes, pentyltrialkoxysilanes, hexyltrialkoxysilanes, heptyltrialkoxysilanes, octyltrialkoxysilanes, propylmethyldialkoxysilanes and butylmethyldialkoxysilanes, and the alkoxy groups are in particular methoxy, ethoxy or propoxy groups.

The oligomeric organosiloxanes which can be used in the novel process are in particular those found in EP 0 518 057 A1 and DE 196 24 032 A1, hereby incorporated by reference. It is preferable in the present process to use those which, as substituents, have (i) alkyl and alkoxy groups, in particular linear, branched or cyclic alkyl groups having from 1 to 24 carbon atoms and alkoxy groups having from 1 to 3 carbon atoms, or (ii) vinyl and alkoxy groups and, if desired, alkyl groups, in particular alkoxy groups having from 1 to 3 carbon atoms and, if desired, linear, branched or cyclic alkyl groups having from 1 to 24 carbon atoms, where the abovementioned oligomeric organoalkoxysiloxanes preferably have a degree of oligomerization of from 2 to 50, particularly preferably from 3 to 20. Particular preference is given here to oligomeric methoxysilanes with vinyl functionality, such as DYNASYLAN® 6490 or oligomeric methoxysilanes with propyl functionality, for example DYNASYLAN® BSM 166.

In the process a solvent may be used which contains preparation based on monomeric organoalkoxysilanes and/ or on oligomeric organoalkoxysiloxanes, where this preferably comprises methanol, ethanol, n-propanol, isopropanol and/or water as solvent. Such solvent-containing preparations may also comprise emulsifiers. Preparations based on water-soluble organopolysiloxanes, as found in particular in EP 0 716 127 A2, EP 0 716 128 A2, EP 0 675128 A1 and DE 5 196 39 782 A1, all of which are hereby incorporated by reference, may advantageously be used.

Particular preference is given to the use in the novel process of a preparation based on water-soluble organopolysiloxanes, where the organopolysiloxanes contain, besides OH groups, at least one group with aminoalkyl functionality and, if desired, at least one other functional group selected from alkyl, in particular n-alkyl having from 1 to 8 carbon atoms, alkenyl, in particular vinyl, glycidyl ether alkyl, methacryloxyalkyl and mercaptoalkyl, and an organofunctional group is bonded to each silicon atom of the organopolysiloxanes and the average degree of oligomerization of the organopolysiloxanes is from 2 to 50, particularly preferably from 3 to 20.

It is particularly preferable in the novel process to use an aqueous preparation which has a content of less than 0.5% by weight of alcohol, based on the entire preparation, and a pH of from 2 to 6 or from 8 to 12.

It is very particularly preferable here to use a water-based preparation of practically completely hydrolyzed organopolysiloxanes, where the organopolysiloxanes contain in particular 3-aminopropyl groups and vinyl groups as functional groups, and each-silicon atom of the organopolysiloxanes carries an organofunctional group, for example DYNASYLAN® HS 2907.

The novel process may generally be carried out as follows:

the coating agent, which is generally liquid, may be introduced directly into a bed of powder flame retardant, e.g. ammonium polyphosphate, fluidized by introducing a gas. This usually results in encapsulation of the particles of the flame retardant with the coating agent, during which the coating agent reacts with the surface of the flame retardant and alcohol of hydrolysis and water of condensation, respectively, may be liberated.

After application of the coating agent, the flame retardant treated in this way is, if desired, freed in a subsequent mixing procedure from any water of condensation and, respectively, alcohol of hydrolysis still adhering thereto, e.g. by introducing hot dry air and reducing the pressure. Whereas the coating processes known hitherto operate in an organic solvent, the process of the present invention generally does not require any type of auxiliary material which is complicated to handle or particularly polluting in the environment.

The present process may also include the following process techniques:
(1) Converting the flame retardant to be coated into a fluidized bed in a suitable apparatus, examples of which are mixers of various speeds or the like, so that the powder flame retardant introduced is constantly in motion, with contact between the individual particles uninterrupted. A gas, e.g. or, nitrogen or $CO_2$, may also be fed to the apparatus, the gas being preheated if desired. It is also possible to use an apparatus which can be heated.
(2) Introducing the coating agent in very evenly distributed form into the fluidized material, by injection or dropwise addition or spraying the coating agent into the fluidized material.

The amount of the coating agent to be applied generally depends on the application of the flame retardant and is usually dependent on the magnitude of the specific surface area of the flame retardant, and also on the amount of the flame retardant. For example, the ratio of the specific surface area of the flame retardant to the wetting area per unit of coating agent for a monomolecular layer can be used as a guide.

Using the present invention, surface-modified flame retardants can be obtained in a simple, cost-effective and environmentally friendly manner. Moreover compared with untreated flame retardants or those treated with other coating agents, the flame retardants also have lower water solubility and advantageous properties for further processing in polymer compositions. For example it is possible to add relatively large amounts of the flame retardant (filler level), with easier incorporation, and with less effect on physical properties.

The flame retardants surface-modified and stabilized by the novel process can be incorporated into many combustible polymers with particularly advantageous effect, for example, into polyolefins, such as polyethylene, polypropylene and polystyrene and its copolymers, such as ABS and SAN, saturated or unsaturated polyesters, polyamides, epoxy resins, phenolic resins, furan resins and polyurethanes, and also natural or synthetic rubbers.

Novel surface-modified flame retardants may, however, also be used advantageously for the intumescent coating of combustible materials. The flame retardants according to the invention may also be used to provide flame retardant or flame proof combustible naturally occurring materials, such as wood, particle board and paper, or these may be given an intumescent coating using a dispersion containing the novel flame retardants.

The halogen-free nature of the novel flame retardants is also advantageous and means that the products produced from them fulfill the market's increasing demand for environmental compatibility. The present invention therefore also provides the use of novel flame retardants in polymer compounds and for rendering combustible naturally occurring materials flame retardant.

EXAMPLES

Having generally described this invention, a further understanding can be obtained by reference to certain specific examples which are provided herein for purposes of illustration only and are not intended to be limiting unless otherwise specified.

Example 1

1832 g of ammonium polyphosphate were placed into a plowshare mixer (LÖDIGE type), the volume of whose mixing space was 3 liters. The mixer was sealed and the agitator set in motion. The rotation rate was 200 rpm and the agitators induced vigorous motion in the powder. 18.5 g of an oligomeric propylmethoxysiloxane (DYNASYLAN® BSM 166) were fed into the mixing space via an aperture in its cover within a period of one minute. After addition of the coating agent was complete, mixing continued for 60 minutes. The ammonium polyphosphate was then removed from the mixer, and the surface-treated material was divided into two parts. One half was dried in air for 24 hours, and the other half for 2 hours at 90° C. in a circulating air drying cabinet with 20% fresh air feed. After drying, both portions showed very small weight reductions: air-dried 0.04% by weight, oven-dried 0.10% by weight.

The coated flame retardant was tested by determining its sedimentation behavior in water (flotation test):

70 ml of demineralized water were placed into each of a number of large test tubes. The flame retardant to be tested was applied to the surface of the water by means of a spatula: one spatula tip, about 50–200 mg (depending on the bulk density of the flame retardant). The stop clock was started, and an estimate was made as to how much of the amount of flame retardant applied had settled at the bottom of the test tube after 15 seconds. After one minute, the test tube was shaken for from 1 to 2 seconds and then another estimate was immediately made of the amount of sediment. The estimate of the amount of settled flame retardant was repeated after 5 minutes and after 18 hours total testing time.

The following results were obtained with the ammonium polyphosphate surface-modified as in Example 1, compared with untreated ammonium polyphosphate:

TABLE 1

| Surface treatment | Amount applied in mg | Settled flame retardant proportion in % after | | | |
|---|---|---|---|---|---|
| | | 15 sec | 60 sec (+ shaking) | 5 min | 18 h |
| none | 190 | 95 | 100 | 100 | 100 |
| 1% (oven-dried) | 170 | 0 | 0 | 0 | 10 |
| 1% (air-dried) | 160 | 0 | <5 | 5 | 20 |

It can be seen from Table 1 that the treatment with the coating agent markedly affects water-wettability, i.e. most of the treated product is so strongly hydrophobicized that it floats on the surface of the water.

These hydrophobic surface properties of the flame retardant mean that when it is incorporated into a polymer matrix, in particular in the case of polyolefins, compatibility with the polymer is improved (similarity to the polymer chains is increased).

The coated flame retardant was also tested for compatibility with water (dispersion test) by attempting to prepare a dispersion with 75% solids content in water, and to measure the viscosity of this dispersion with a rotary viscometer (BROOKFIELD type). Table 2 below shows the results:

TABLE 2

| Surface treatment | Dispersion medium | Viscosity of a 3:1 APP/water mixture in MPa s |
|---|---|---|
| none | water | 600 |
| air-dried as in Example 1 | water | not measurable - paste |
| oven-dried as in Example 1 | water | not measurable - paste |

Table 2 clearly indicates the well developed hydrophobicization of the coated product. The untreated product can be easily suspended in water due to its hydrophilic surface, whereas only a paste can be obtained from the coated specimens.

Example 2

1904 g of ammonium polyphosphate were placed in a plowshare mixer 15 (LÖDIGE type) provided with heating and having a mixing space volume of 3 liters. The mixer was sealed and the agitator set in motion The rotation rate was 240 rpm, and the agitators induced vigorous motion in the powder. 47.5 g of a 40% strength solution of an oligomeric propylmethoxysiloxane (DYNASYLAN® BSM 166) in 96% strength ethanol were fed into the mixing space via metering equipment within a period of three minutes. After addition of the coating agent was complete, mixing was continued for 30 minutes. Heating of the mixer was then started, using a temperature control system with heat-transfer oil. Within a period of 30 minutes the temperature of the mix was increased to 80° C., for which a heating jacket temperature of 85° C. was needed. Once the temperature of the mix had reached 80° C., the metering equipment was exchanged for a vacuum connection and the mixing space was brought to about 400 hPa of reduced pressure. The air removed by suction was passed through cold traps in which ethanol and water condensed. The reduced-pressure treatment of the ammonium polyphosphate was conducted for a period of 30 minutes at 80° C. The mixer was then returned to atmospheric pressure and mixing continued without heating for a further 30 minutes before the ammonium polyphosphate (still warm, about 50° C.) was removed from the mixer and discharged.

To test the coated flame retardant, the viscosity of a 3:1 ammonium polyphosphate/water mixture and sedimentation behavior in water were determined as in Example 1. The results corresponded to those obtained with the ammonium polyphosphate surface-modified in Example 1, in the version with oven-drying.

Example 3

1515 g of an ammonium orthophosphate (FR CROS® 282) were placed in the plowshare mixer described in Example 1 and mixed with vigorous motion at a rotation rate of 200 rpm. 15.2 g of DYNASYLAN® BSM 166 were fed into the mixing space within a period of 5 minutes via an aperture in the mixer cover. After addition of the coating agent was complete, mixing was continued for 15 minutes. The ammonium phosphate was then removed from the mixer, and the coated material was dried for two hours at 90° C. in a circulating oven drying cabinet with 20% fresh air feed.

Example 4

1306 g of a dimelamine orthophosphate (BUDIT® 310) were placed in the plowshare mixer described in Example 1 and mixed with vigorous motion at a rotation rate of 200 rpm. 10.4 g of DYNASYLAN® BSM 166 were fed into the mixing space within a period of 4 minutes via an aperture in the mixer cover. After addition of the coating agent was complete, mixing was continued for 15 minutes. The dimelamine orthophosphate thus treated was then removed from the mixer, and dried for two hours at 90° C. in a circulating oven drying cabinet with 20% fresh air feed.

Example 5

1522 g of a melamine borate (BUDIT® 313) were placed in the plowshare mixer described in Example 1 and mixed with vigorous motion at a rotation rate of 200 rpm. 38.0 g of DYNASYLAN® BSM 166 were fed into the mixing space within a period of 10 minutes via an aperture in the mixer cover. After addition of the coating agent was complete, mixing was continued for 15 minutes. The melamine borate was then removed from the mixer, and the coated material was dried for two hours at 90° C. in a circulating oven drying cabinet with 20% fresh ad feed.

Example 6

1010 g of a melamine cyanurate (BUDIT® 315) were placed in the plowshare mixer described in Example 1 and mixed with vigorous motion at a rotation rate of 200 rpm. 20.2 g of DYNASYLAN® BSM 166 were fed into the mixing space within a period of 7.5 minutes via an aperture in the mixer cover. After addition of the coating agent was complete, mixing was continued for 15 minutes. The melamine cyanurate was then removed from the mixer, and the treated material was dried for two hours at 90° C. in a circulating oven drying cabinet with 20% fresh air feed.

Example 7

The method described in Example 1 for determining the sedimentation behavior of surface-modified flame retardants in water (flotation test) was applied to the surface-treated flame retardants obtained in Examples 3 to 6. Table 3 shows the results obtained, which illustrate the changes achieved in the surface properties of the flame retardants.

TABLE 3

| Flame retardant | Coating with DYNASYLAN ® BSM 166 | Amount applied in mg | Settled flame retardant proportion in % after | | | |
|---|---|---|---|---|---|---|
| | | | 15 sec | 60 sec (+ shaking) | 5 min | 18 h |
| Ammonium orthophosphate (FR CROS ® 282, Example 3) | none | 80 | 100 | 100 | 100 | 100 |
| | 1% | 80 | 5 | 75 | 90 | 90 |
| Dimelamine orthophosphate (BUDIT ® 310, Example 4) | none | 100 | 65 | 100 | 100 | 100 |
| | 1% | 60 | 0 | <5 | 5 | 40 |
| Melamine borate (BUDIT ® 313, Example 5) | none | 150 | 70 | 100 | 100 | 100 |
| | 1% | 130 | 0 | 5 | 20 | 25 |
| Melamine cyanurate (BUDIT ® 315, Example 6) | none | 100 | 25 | 85 | 95 | 100 |
| | 1% | 70 | <5 | 50 | 75 | 85 |

Example 8

The water solubility of the flame retardants surface-modified in Examples 1, 3 and 4 was studied. To this end, 50 g of each flame retardant was shaken with 200 g of water for 1 hour at 20° C., followed by filtering and determination of the dry residue from the filtrate, cf. Table 4.

TABLE 4

| | Dry residue | |
|---|---|---|
| Flame retardant | without surface treatment | with surface treatment |
| Ammonium polyphosphate (FR CROS ® 484) | 0.30% | 0.25% |
| Dimelamine orthophosphate (BUDIT ® 310) | 0.42% | 0.29% |

TABLE 4-continued

| | Dry residue | |
|---|---|---|
| Flame retardant | without surface treatment | with surface treatment |
| Ammonium orthophosphate (FR CROS ® 282) | 10.3% | 5.3% |

The results in Table 4 show that in some cases the surface treatment considerably reduces water solubility, by 17% for ammonium polyphosphate, 31% for melamine phosphate and 49% for ammonium orthophosphate. Polymer compounds prepared using these coating flame retardants with reduced water solubility will be less sensitive to exposure to water.

Example 9

The FR CROS® 484 ammonium polyphosphate surface-treated as in Example 1, but using 1% by weighs of DYNASYLAN® AMEO, is added to an aqueous textile treatment agent composed of: 75 parts water, 150 parts ammonium polyphosphate FR CROS® 484, and 600 parts MOWILITH® DM 1831.

The effect on pH and viscosity was studied in comparison with untreated material, cf. Table 5.

TABLE 5

| | pH | Solubility of $H_2O$ | Ford No. 4 cup viscosity at start of storage | Ford No. 4 cup viscosity after 22 days storage |
|---|---|---|---|---|
| FR CROS ® 484 AMEO-treated (1% by wt.) | 7.20 | 0.08 | 37 sec | 44 sec |
| FR CROS 484, untreated | 5.80 | 0.20 | 88 sec | 93 sec |

The lowering of viscosity improves the processability of dispersions prepared with coated flame retardants, for example dispersions used as intumescent paints, and this processability is retained for a prolonged period. The lowering of viscosity also permits a higher filler level, i.e. more flame retardant in the system.

Obviously, numerous modifications and variations of the present invention are possible in light of the above teachings. It is therefore to be understood that within the scope of the appended claims, the invention may be practiced otherwise than as specifically described herein.

The priority document of the present application, German Patent Application No. 19830128.6, filed Jul. 6, 1998, is hereby incorporated by reference.

What is claimed is:

1. A process for preparing an encapsulated flame retardant, comprising:
    applying an organic silicon composition to a powder flame retardant, to form said encapsulated flame retardant, wherein said powder flame retardant is at least one member selected from the group consisting of ammonium orthophosphates, ammonium diphosphates, ammonium polyphosphates, melamine borates, melamine oxalates, melamine phthalates, melamine cyanurate and melamine borophosphates.

2. The process of claim 1, wherein 0.05 to 10% by weight of said organic silicon composition is applied, based on the amount of said powder flame retardant.

3. The encapsulated flame retardant prepared by the process of claim 2.

4. A composition, comprising a polymer or polymer compound, and the encapsulated flame retardant of claim 3.

5. A combustible material coated with the encapsulated flame retardant of claim 3.

6. A method of making composition, comprising:
    forming an encapsulated flame retardant by the method of claim 2; and
    mixing said encapsulated flame retardant with a polymer of polymer compound.

7. A method of making a coated combustible material, comprising:
    forming an encapsulated flame retardant by the method of claim 2; and
    coating a combustible material with said encapsulated flame retardant.

8. The process of claim 1, wherein said applying is carried out over a period of 10 seconds to 2 hours at a temperature of 0 to 200° C.

9. The process of claim 1, further comprising post-treating said encapsulated flame retardant, by heating or exposing to reduced pressure.

10. The process of claim 9, wherein said post-treating is carried out at a temperature of 0 to 200° C.

11. The process of claim 9, wherein said applying is repeated, and said post-treating is repeated.

12. The process of claim 1, wherein said applying is carried out in a stream of air or inert gas.

13. The process of claim 1, wherein said applying is repeated.

14. The encapsulated flame retardant prepared by the process of claim 13.

15. A composition, comprising a polymer or polymer compound, and the encapsulated flame retardant of claim 14.

16. A combustible material coated with the encapsulated flame retardant of claim 14.

17. A method of making composition, comprising:
    forming an encapsulated flame retardant by the method of claim 13; and
    mixing said encapsulated flame retardant with a polymer of polymer compound.

18. A method of making a coated combustible material, comprising:
    forming an encapsulated flame retardant by the method of claim 13; and
    coating a combustible material with said encapsulated flame retardant.

19. The process of claim 1, wherein said powder flame retardant has an average particle size ($d_{50}$) of from 1 to 100 $\mu$m.

20. The encapsulated flame retardant prepared by the process of claim 19.

21. A composition, comprising a polymer or polymer compound, and the encapsulated flame retardant of claim 20.

22. A combustible material coated with the encapsulated flame retardant of claim 20.

23. The process of claim 1, wherein said organic silicon composition comprises at least one alkoxysilane having at least one functionality selected from the group consisting of aminoalkyl, epoxyalkyl, acryloxyalkyl, methacryloxyalkyl, mercaptoalkyl, alkenyl and alkyl.

24. The encapsulated flame retardant prepared by process of claim 23.

25. A composition, comprising a polymer or polymer compound, and the encapsulated flame retardant of claim 24.

26. A combustible material coated with the encapsulated flame retardant of claim 24.

27. The process of claim 1, wherein said organic silicon composition comprises at least one oligomeric organosiloxane comprises alkoxy groups.

28. The process of claim 27, wherein said oligomeric organosiloxane comprises at least one member selected from alkyl groups and vinyl groups.

29. The process of claim 1, wherein said organic silicon composition is prepared by mixing components comprising:
 (i) at least one member selected from the group consisting of monomeric organosilanes and oligomeric organosiloxanes, and
 (ii) at least one member selected from the group consisting of methanol, ethanol, n-propanol, isopropanyl and water.

30. The process of claim 1, wherein said organic silicon composition comprises at least one solvent-containing preparation based on water-soluble organopolysiloxanes,
 wherein said organopolysiloxanes comprises OH groups, and at least one group with aminoalkyl functionality, an organofunctional group is bonded to each silicon atom of said organosiloxanes and the average degree of oligomerization of the organosiloxanes is 2 to 50.

31. The process of claim 30, wherein said organopolysiloxanes further comprises at least one functional group selected from the group consisting of alkyl, alkenyl, glycidic ether alkyl, methacryloxyalkyl and mercaptoalkyl.

32. The process of claim 30, wherein said organic silicon composition comprises less than 0.5% by weight of alcohol, based on the entire preparation, and has a pH of 2 to 6 or 8 to 12.

33. The encapsulated flame retardant prepared by the process of claim 32.

34. A composition, comprising a polymer or polymer compound, and the encapsulated flame retardant of claim 33.

35. A combustible material coated with the encapsulated flame retardant of claim 33.

36. The encapsulated flame retardant prepared by the process of claim 1.

37. A composition, comprising a polymer or polymer compound, and the encapsulated flame retardant of claim 36.

38. A combustible material coated with the encapsulated flame retardant of claim 36.

39. A method of making composition, comprising:
 forming an encapsulated flame retardant by the method of claim 1; and
 mixing said encapsulated flame retardant with a polymer of polymer compound.

40. A method of making a coated combustible material, comprising:
 forming an encapsulated flame retardant by the method of claim 1; and
 coating a combustible material with said encapsulated flame retardant.

* * * * *

UNITED STATES PATENT AND TRADEMARK OFFICE
CERTIFICATE OF CORRECTION

PATENT NO. : 6,444,315 B1
DATED : September 3, 2002
INVENTOR(S) : Barfurth et al.

It is certified that error appears in the above-identified patent and that said Letters Patent is hereby corrected as shown below:

<u>Title page, Item [54] and Column 1, lines 1-4,</u>
Title, should read:

-- SURFACE-MODIFIED FLAME RETARDANTS, THEIR USE, AND PROCESS FOR THEIR PREPARATION --

Signed and Sealed this

Twenty-fourth Day of December, 2002

JAMES E. ROGAN
*Director of the United States Patent and Trademark Office*